US012233673B2

(12) United States Patent
Sotgiu

(10) Patent No.: US 12,233,673 B2
(45) Date of Patent: *Feb. 25, 2025

(54) TYRE-REMOVAL APPARATUS WITH AUTOMATICALLY PIVOTING TOOL

(71) Applicant: Snap-on Equipment Srl a unico socio, Correggio (IT)

(72) Inventor: Paolo Sotgiu, Modena (IT)

(73) Assignee: Snap-on Equipment Srl a unico socio, Correggio (IT)

( * ) Notice: Subject to any disclaimer, the term of this patent is extended or adjusted under 35 U.S.C. 154(b) by 388 days.

This patent is subject to a terminal disclaimer.

(21) Appl. No.: 17/582,930

(22) Filed: Jan. 24, 2022

(65) Prior Publication Data

US 2022/0234401 A1 Jul. 28, 2022

(30) Foreign Application Priority Data

Jan. 25, 2021 (IT) .......................... 102021000001235

(51) Int. Cl.
*B60C 25/138* (2006.01)
*B60C 25/05* (2006.01)

(52) U.S. Cl.
CPC .......... *B60C 25/138* (2013.01); *B60C 25/056* (2013.01)

(58) Field of Classification Search
CPC . B60C 25/0548; B60C 25/056; B60C 25/138; B60C 25/05; B60C 25/12;

(Continued)

(56) References Cited

U.S. PATENT DOCUMENTS 5,226,465 A 7/1993 Schon et al.
8,522,850 B2 * 9/2013 Kirstatter .............. B60C 25/056
157/1

(Continued)

FOREIGN PATENT DOCUMENTS

EP  1 157 860 A2  11/2001
EP  1 177 920 A2  2/2002

(Continued)

OTHER PUBLICATIONS

The extended European search report issued by the European Patent Office on May 24, 2022, which corresponds to European U.S. Appl. No. 17/582,930-1012 and is related to U.S. Appl. No. 17/582,930.

*Primary Examiner* — David B. Thomas
(74) *Attorney, Agent, or Firm* — Studebaker & Brackett PC

(57) ABSTRACT

A tyre-removal apparatus includes a base having a support for receiving and rotating a wheel, and a frame joined to the base having an upright with a longitudinal axis substantially parallel to an axis of rotation of the wheel. A support arm associated with the upright is movable substantially parallel to the axis of rotation of the wheel. A tool for operating on the wheel is mounted pivoting on the support arm. A sensor associated with the tool detects a parameter representing contact between the tool and the wheel, and is connected to a control unit controlling an actuator associated with the support arm, to pivot the tool between a withdrawn position with respect to the axis of rotation of the wheel and an advanced position with respect to the axis of rotation of the wheel, depending on the parameter representing contact between the tool and the wheel.

15 Claims, 6 Drawing Sheets

(58) Field of Classification Search
CPC ..... B60C 25/122; B60C 25/125; B60C 25/13; B60C 25/135; B60C 25/14; B60C 25/0563; B60C 25/0581
See application file for complete search history.

(56) References Cited

U.S. PATENT DOCUMENTS

| | | | |
|---|---|---|---|
| 9,114,676 B2 * | 8/2015 | Sotgiu | G01M 17/021 |
| 9,227,473 B2 * | 1/2016 | Sotgiu | B60C 25/138 |
| 9,370,975 B2 * | 6/2016 | Kirstätter | B60C 25/138 |
| 10,906,364 B2 * | 2/2021 | Gonzaga | B60C 25/135 |
| 10,906,365 B2 * | 2/2021 | Corghi | B60C 25/0593 |
| 10,967,687 B2 * | 4/2021 | Liebetreu | B60C 25/138 |
| 11,654,731 B2 * | 5/2023 | Gonzaga | B60C 25/135 157/1.17 |
| 11,712,932 B2 * | 8/2023 | Gonzaga | B60C 25/138 157/1.1 |
| 2015/0298514 A1 | 10/2015 | Nicolini et al. | |
| 2022/0234400 A1 * | 7/2022 | Sotgiu | B60C 25/0581 |

FOREIGN PATENT DOCUMENTS

| | | |
|---|---|---|
| EP | 1 398 184 A1 | 3/2004 |
| EP | 1 584 495 A2 | 10/2005 |
| EP | 1 607 247 A1 | 12/2005 |
| EP | 2 042 351 A1 | 4/2009 |
| EP | 2 110 270 A1 | 10/2009 |
| EP | 2 484 541 A1 | 8/2012 |
| EP | 2 949 486 A1 | 12/2015 |
| EP | 2 949 487 A1 | 12/2015 |
| EP | 2 949 488 A1 | 12/2015 |
| EP | 3 722 114 A1 | 10/2020 |

\* cited by examiner

TYRE-REMOVAL APPARATUS WITH AUTOMATICALLY PIVOTING TOOL

FIELD OF THE INVENTION

The present invention relates to an apparatus for mounting a tyre on a wheel rim and/or for removing a tyre from a wheel rim of a vehicle, generally known as a tyre-removal apparatus or machine, provided with an automatically pivoting tool. Also included within the scope of the present invention is an automatically pivoting tool designed to be used in a tyre-removal machine and a method for removing a tyre from a wheel rim of a vehicle, which can be performed by means of a tyre-removal apparatus according to the present invention.

Present State of the Art

The wheels of vehicles are generally composed of a rim and a tyre mounted on it. Tyre-removal apparatus are generally used in car repair workshops in order to remove the tyres from the rims and/or to mount said tyres on respective rims.

Before being able to remove a tyre from a rim it is required to perform so-called bead breaking of the tyre, namely it is required to obtain the complete separation of both the beads of the tyre from the rim, using a special bead breaker tool. Only after this operation is it possible to then proceed with the actual operation of removing the tyre from the rim, generally using suitable mounting/demounting tools.

The bead breaker tools may be of different types, for example of the blade or paddle type, roller type, disc type, etc. Disc tools are particularly widespread on more efficient and modern tyre-removal machines. These disc-type bead breaker tools usually comprise a rotatable disc which, sometimes, but not always, is shaped with a frustoconical form and is mounted idle on a support arm. The disc of the bead breaker tool, or bead breaker disc, is placed in contact with the sidewall of the tyre of a wheel which is fixed on a rotating support. With rotation of the support, the wheel, which is rigidly fixed thereto, will also start to rotate, allowing the bead breaker tool to operate on the tyre along an entire circumferential revolution and therefore separate completely the bead of the tyre from the rim.

In order to complete successfully a bead breaking operation in a short time and without damaging either the sidewall of the tyre, the wheel rim or the bead breaker tool itself, it is important to position correctly the tool both relative to the rim and relative to the tyre.

In particular, with the wheel stationary, deflated and mounted on the support, the bead breaker disc is moved towards the edge of the rim, usually without touching it however, and instead brought into contact with the sidewall of the tyre.

In order to perform the actual bead breaking process, the bead breaker disc is preferably pivoted or nevertheless advanced towards the axis of rotation of the wheel, so as to be inserted between the edge of the rim (sometimes, however, touching it) and tyre, thereby starting the gradual separation of the bead of the tyre from the rim, while rotation of the tyred wheel in the meantime is started.

In order to complete the bead breaking process, it is then usually necessary, during the course of the process itself, to move the bead breaker tool also parallel to the axis of rotation of the wheel, with the tyred wheel still rotating, so as to allow the bead breaker disc to interact better with the sidewall of the tyre and/or with the rim channel.

Once this process has been completed and both the beads separated, the tyre may be completely removed from the rim, usually with the aid of further demounting tools, such as levers, hooks, etc.

Sometimes, the demounting tools are combined with respective mounting tools, or special mounting/demounting tools may be provided, i.e. tools which may perform both the mounting and demounting functions.

These mounting and/or demounting tools, in the more modern and efficient tyre-removal machines, are often also able to pivot towards and/or away from the axis of rotation of the wheel, so as to interact better with the sidewall of the tyre and/or with the rim channel.

As mentioned, if this not performed properly, both the bead breaking process and the subsequent tyre removal process may not be effective or may not result in complete separation of the tyre beads from the rim or may result in damage to the tyre, rim or both of them.

Over time various solutions have been proposed for helping the operator of a tyre-removal machine to position correctly the tools with respect to the wheel, in particular for automating the pivoting movement of these tools, both in the case of bead breaker tools and in the case of mounting and/or demounting tools.

For example various solutions for automating the pivoting movement of the bead breaker disc have been proposed.

U.S. Pat. No. 5,226,465 and EP1157860A2 describe tyre-removal machines provided with a disc-type bead breaker tool supported by a frame able to move parallel to the axis of rotation of the wheel. These tyre-removal machines are provided with a cam mechanism for pivoting the bead breaker disc and inserting it underneath the edge of the rim.

EP1607247A1 illustrates a disc-type bead breaker tool for tyre-removal machines, said bead breaker tool being able to be pivoted owing to the action of a pneumatic actuator.

Also known are solutions which, while they do not envisage pivoting of the bead breaker disc, nevertheless aim to make the bead breaking operation safer and more efficient by controlling the movement of the bead breaker tool with respect to the wheel.

For example EP1584495A2 illustrates a tyre-removal machine provided with a disc-type bead breaker tool combined with a sensor pin able to detect the presence of the wheel coming into contact with the edge or flange of the rim or with the sidewall of the tyre.

EP2484541A1 describes a tyre-removal machine provided with a disc-type bead breaker tool able to move along a direction parallel to the axis of rotation of the wheel and provided with a control unit able to detect the advancing speed curve of the tool along this direction.

EP3722114A1 illustrates a tyre-removal machine provided with a bead breaker tool comprising a support element and a bead breaker disc, said bead breaker tool further comprising a sensor able to cause a relative rotation of the support element and the bead breaker disc.

Also known are tyre-removal machines provided with pivoting mounting/demounting tools, for example EP1398184A1 illustrates a tyre-removal machine provided with a pivoting demounting tool, pivoting of which is obtained by means of actuator means.

EP1177920A2 describes a tyre-removal machine provided with a pivoting demounting tool, pivoting of which is obtained by means of a pneumatic actuator.

EP2949488A1 illustrates a pivoting mounting/demounting tool for tyre-removal machines, pivoting of which is obtained by the interaction of the tool with the wheel.

Finally, EP2110270A1 illustrates a tyre-removal machine provided with non-pivoting tools, i.e. both bead breakers and mounting/demounting tools, which are, however, able to move, owing to the actuator means, parallel to the axis of rotation of the wheel and the movement of which along this direction is monitored by a special sensor.

The known solutions may however be further improved as regards reliability, safety, precision and ease of use.

OBJECT OF THE INVENTION

In this context the aim of the Applicant is to propose a tyre-removal apparatus which is provided with a tool of the pivoting type and which, compared to the prior art, has a simpler design, is more reliable and more robust and is easy to maintain.

Another object of the present invention is to provide a tyre-removal apparatus which is provided with a tool of the pivoting type and which, compared to the prior art, is able to ensure a greater precision and efficiency when it is used, so as to allow correct and complete execution of the tyre bead breaking and/or demounting operation, while at the same time avoiding possible damage to rims, tyres and the tool itself, and to speed up said procedure.

In particular, an object of the present invention is to provide a tyre-removal apparatus which is provided with a tool of the pivoting type and which is easy to use also for an unskilled operator.

A further object of the present invention is to provide a method for demounting a tyre from a wheel rim, making use of a tyre-removal apparatus which is provided with a tool of the pivoting type and which is able to overcome the drawbacks of the prior art.

A further object of the present invention is to provide a pivoting tool for tyre-removal machines which is able to make the process of breaking beads and/or of removing the tyre from the rim more reliable, more precise and simpler.

In particular, an object of the present invention is to provide a pivoting bead breaker tool which is able to overcome the problems of the prior art and which makes it possible to carry out a safer, more precise, more reliable and quicker bead-breaking operation.

Similarly, another particular object of the present invention is also that of providing a pivoting demounting tool or a pivoting mounting/demounting tool, which is able to overcome the problems of the prior art and which makes it possible to carry out a safer, more precise, more reliable and quicker operation of removing the tyre from the rim.

SUMMARY OF THE INVENTION

The Applicant has found that these and further objects are achieved by an apparatus for mounting a tyre on a wheel rim and/or for removing a tyre from a wheel rim of a vehicle, comprising a base having a support for receiving and rotating the wheel.

The tyre-removal apparatus according to the present invention further comprises a frame joined to the base and having an upright with a longitudinal axis substantially parallel to the axis of rotation of the wheel, or of the rotating support on which the wheel rim is reversibly fixed.

A support arm, movable in the direction of longitudinal extension of the upright, namely along a direction substantially parallel to the axis of rotation of the wheel, is associated with the upright of the frame.

According to one embodiment, the support arm comprises at least one component movable in a direction substantially perpendicular to the axis of rotation of the wheel or to the direction of longitudinal extension of the upright.

A tool for operating on the wheel is mounted on the support arm.

According to one embodiment, the tool is mounted on the at least one component of the support arm, movable in the direction substantially perpendicular to the axis of rotation of the wheel.

In each case, mounting of the tool is such as to allow pivoting of the tool with respect to the support arm itself, i.e. the tool is mounted pivoting about a pivot pin which allows it to oscillate. A sensor, associated with the tool, is able to detect at least one parameter representing contact between the tool and the wheel, and is operationally connected to a control unit able to control an actuator, associated with the support arm or with the at least one component of the support arm, movable in the direction substantially perpendicular to the axis of rotation of the wheel, so as to pivot the tool between a first withdrawn position with respect to the axis of rotation of the wheel and a second advanced position with respect to the axis of rotation of the wheel, depending on the at least one parameter representing the contact between the tool and the wheel.

According to one embodiment, the tool is a demounting tool, or a mounting/demounting tool.

According to another embodiment, the tool is a bead breaker tool, in particular a bead breaker disc mounted rotatably idle on the support arm.

According to one embodiment, the parameter representing the contact between the tool and the wheel, obtained by the sensor associated with the tool, is correlated with a reaction force generated by the elastic deformation of the tyre. In this embodiment, the sensor may be, for example, a force sensor.

According to one embodiment, the parameter representing the contact between the tool and the wheel, obtained by the sensor associated with the tool, is correlated with a slight oscillation of the tool with respect to the support arm, which occurs when the tool touches the tyre, without however generating actual complete pivoting of the tool with respect to the support arm and/or significant elastic deformations of the tyre. In this embodiment, the sensor may be, for example, of the switch type or a proximity sensor able to detect an initial oscillation of the tool with respect to the support arm.

The embodiments described above may be realized both when the pivoting tool is a bead breaker tool, for example of the disc type, and when this tool is instead a demounting tool or mounting/demounting tool.

According to a further embodiment, which may be realized for example when the pivoting tool is a bead breaker disc mounted rotatably idle on the support arm, the at least one parameter representing the contact between the tool and the wheel is correlated with a rotation of the bead breaker disc relative to the support arm. This rotation of the bead breaker disc is generated, as a result of being pulled along, by the rotation of the tyre with which the bead breaker disc generally makes contact. In this embodiment, the sensor may be, for example, a proximity sensor, an optical sensor, etc.

In a preferred embodiment, the tool is provided with a plurality of sensors able to send, to the control unit responsible for controlling the actuator for pivoting the tool, a plurality of respective and separate parameters representing the contact between the tool and the wheel. The control unit will therefore be able to control the actuator for pivoting the tool with greater precision.

In one embodiment, the actuator for pivoting the tool is of the pneumatic, or electrical or electromechanical type.

According to one embodiment, the tyre-removal apparatus comprises a hydraulic or pneumatic actuator for moving the support arm along the direction substantially parallel to the axis of rotation of the wheel.

The hydraulic or pneumatic actuator has associated with it at least one pressure or feed rate sensor able to detect a pressure or feed rate parameter, respectively, representing the contact between the tool and the wheel, said at least one pressure or feed rate sensor being operationally connected to the control unit.

According to this embodiment, when the sensor associated with the hydraulic or pneumatic actuator is a pressure sensor, since this hydraulic or pneumatic actuator generally comprises a piston sliding inside a jacket defining therein a first chamber upstream of the piston and a second chamber downstream of the piston, the pressure sensor is configured to determine a first pressure relating to the first chamber and a second pressure relating to the second chamber. In a possible first variant, a single pressure sensor operationally connected preferably to both the chambers is present, said single pressure sensor being able to send to the control unit a signal representing the pressure difference between the two chambers.

According to a possible second variant, a single chamber, or both the chambers, of the hydraulic or pneumatic actuator, are provided with a dedicated pressure sensor able to communicate the pressure values of each chamber to the control unit in a manner independently of the dedicated pressure sensor of the other chamber, where present.

According to an alternative embodiment, the support arm is moved along the direction substantially parallel to the axis of rotation of the wheel by an electric motor.

This electric motor has associated with it a current or speed or acceleration sensor able to detect a current consumption or a speed or an acceleration parameter, respectively, of said motor, representing the contact between the tool and the wheel, said at least one current or speed or acceleration sensor being operationally connected to the control unit.

In connection with this embodiment, and if the parameter detected relates to a speed or an acceleration, according to a possible first variant, it may obviously be related both to the rotating shaft of the motor and to any other rotating component connected thereto. In this case, the sensor used may for example be an encoder or any other sensor designed to detect the speed and/or acceleration of a rotating component.

According to a second variant, if, for example, the electric motor is of the linear type, the sensor used will instead be able to detect a speed and/or a linear acceleration.

If instead the parameter detected relates to the current consumption of the motor, the sensor used may be for example a Hall effect sensor, current measurement sensor, etc.

According to a further embodiment which is an alternative to the preceding embodiments, the support arm is moved along the direction substantially parallel to the axis of rotation of the wheel by an electromechanical actuator.

Said electromechanical actuator has associated with it at least one force or torque sensor able to detect a force or a resistive torque parameter, respectively, representing the contact between the tool and the wheel, said at least one force or torque sensor being operationally connected to the control unit.

In a preferred embodiment, the control unit is designed to receive a plurality of signals correlated with parameters representing the contact between the tool and the wheel. For example, these signals could be received from the sensor (or from the plurality of sensors, as discussed above) with which the tool is provided, and also from the sensor (or the plurality of sensors) provided on the actuator for moving the support arm along the direction substantially parallel to the axis of rotation of the wheel, independently of the type of actuator used (for example hydraulic actuator, pneumatic actuator, electric motor, electromechanical actuator, etc.).

According to a preferred embodiment, the control unit is able both to receive at least one signal, representing the contact between the tool and the wheel, from at least one sensor associated with the tool, and to receive at least one further signal, also representing the contact between the tool and the wheel, from at least one sensor associated with the actuator for moving the tool support arm along the direction substantially parallel to the axis of rotation of the wheel.

In this way, the control unit will be able to control the actuator for pivoting the tool with even greater precision.

According to one embodiment, the tool support arm comprises at least one first position and/or speed and/or acceleration sensor designed to detect the position and/or the speed and/or the acceleration of the support arm along the direction substantially parallel to the axis of rotation of the wheel.

In a first variant, for example, but not necessarily, when the actuator for moving the support arm along the direction substantially parallel to the axis of rotation of the wheel is a hydraulic or pneumatic actuator, said first position and/or speed and/or acceleration sensor is preferably associated directly with the support arm, namely is not associated with the actuator for moving said support arm. In this case, said first position and/or speed and/or acceleration sensor may for example be a sensor of the optical or potentiometric type, or any other known sensor suitable for this purpose.

In a second variant, for example, but not necessarily, when the actuator for moving the support arm along the direction substantially parallel to the axis of rotation of the wheel is an electric motor or an electromechanical actuator, said first position and/or speed and/or acceleration sensor is preferably, but not necessarily, associated with the motor or the actuator, as described in the respective embodiments of this motor or actuator. It should however be remembered that, even when the actuator for moving the support arm, is an electric or electromechanical actuator, it is obviously possible to provide the support arm with a position and/or speed and/or acceleration sensor, along the direction substantially parallel to the axis of rotation of the wheel, which is entirely independent of the actuator. This sensor may be for example of the optical, potentiometric or other type.

According to a further embodiment, the tool support arm, or the at least one component of the support arm, movable in the direction substantially perpendicular to the axis of rotation of the wheel, comprises at least one second position and/or speed and/or acceleration sensor designed to detect the position and/or the speed and/or the acceleration of the support arm, or the at least one component of the support arm, movable in the direction substantially perpendicular to the axis of rotation of the wheel, along this direction substantially perpendicular to the axis of rotation of the wheel.

According to one embodiment, the control unit is able to control the actuator for pivoting the tool, depending on an optimized signal generated by a combination of the at least one parameter representing the contact between the tool and the wheel, together with at least one signal representing the position and/or speed and/or acceleration of the support arm, or a component thereof, obtained by the first and/or the second position and/or speed and/or acceleration sensor of the support arm or a component thereof. In other words, said optimized signal may be based on a combination of the at least one parameter representing the contact between the tool and the wheel, together with one or more signals representing the position and/or speed and/or acceleration of the support arm or a component thereof, both along a direction substantially parallel to the axis of rotation of the wheel, and along a direction substantially perpendicular to the axis of rotation of the wheel.

According to one embodiment, the control unit is able to receive a plurality of signals, both from one or more sensors associated with the tool, representing the contact between the tool and the wheel, and from one or more sensors associated with the actuator for moving the tool support arm along the direction substantially parallel to the axis of rotation of the wheel, also representing the contact between the tool and the wheel, as well as from one or more sensors for detecting the position and/or the speed and/or the acceleration of the support arm, or a component thereof, with respect to the direction substantially perpendicular to the axis of rotation of the wheel.

All these signals may be combined in varying ways in order to improve the precision and the reliability of control of the pivoting movement of the tool.

According to one embodiment, the tyre-removal apparatus according to the present invention comprises input means, operationally connected to the control unit, for defining a diameter of the rim.

These input means may, for example, comprise a numerical keypad, a mechanical keyboard, etc. Preferably, these input means comprise at least one optical sensor.

According to this embodiment, the tyre-removal apparatus further comprises actuator means, preferably of the electromechanical type, for moving the support arm, or a component thereof, along the direction substantially perpendicular to the axis of rotation of the wheel, said actuator means being controlled by the control unit depending on the diameter of the rim defined by the input means.

According to a first variant of this embodiment, the actuator means are controlled by the control unit depending on a position and/or speed and/or acceleration signal of the support arm, or a component thereof, obtained by the second position and/or speed and/or acceleration sensor, or by the sensor which detects the position and/or speed and/or acceleration of the support arm, or a component thereof, with respect to the direction substantially perpendicular to the axis of rotation of the wheel.

Depending on a second variant of this embodiment, the actuator means are controlled by the control unit depending on a combined signal which takes into account both the diameter of the rim defined by the input means and the position and/or speed and/or acceleration signal of the support arm, or a component thereof, obtained by the second position and/or speed and/or acceleration sensor.

According to one embodiment, the present invention also relates to a method for removing a tyre from a wheel rim of a vehicle.

This method comprises firstly the step of reversibly clamping a tyred wheel, namely a wheel comprising a rim and a tyre, on a special rotating support for receiving and rotating the wheel about its axis of rotation.

Then the method according to the present invention involves the step of positioning a tool for operating on the wheel, in the vicinity of a first edge of the wheel rim, said tool being mounted pivoting on a support arm.

The method further involves the step of moving the support arm along a direction substantially parallel to the axis of rotation of the wheel, and the step of rotating the support.

According to a first variation of embodiment, the step of moving the support arm along a direction substantially parallel to the axis of rotation of the wheel takes place before the step of rotating the support.

According to a different variation of embodiment, the step of moving the support arm along a direction substantially parallel to the axis of rotation of the wheel takes place after the step of rotating the support.

According to a further variation of embodiment, the steps of moving the support arm along a direction substantially parallel to the axis of rotation of the wheel, and the step of rotating the support, take place substantially at the same time.

The method also involves the step of detecting, with a sensor associated with the tool, at least one parameter representing contact between the tool and the wheel.

Said method also comprises the step of sending a signal, relating to the at least one parameter representing the contact between the tool and the wheel, to a control unit able to control an actuator for pivoting the tool, and the step of pivoting the tool between a first withdrawn position with respect to the axis of rotation of the wheel and a second advanced position with respect to the axis of rotation of the wheel, depending on the at least one parameter representing the contact between the tool and the wheel.

According to one embodiment, the method according to the present invention involves the step of detecting, with a plurality of sensors associated with the tool, a respective plurality of parameters representing the contact between the tool and the wheel.

According to a preferred embodiment, the method according to the present invention involves the step of detecting one or more parameters, obtained both by one or more sensors associated with the tool, and representing the contact between the tool and the wheel, and by one or more sensors associated with an actuator for moving the tool support arm, for example along the direction substantially parallel to the axis of rotation of the wheel, and also representing the contact between the tool and the wheel.

According to one embodiment, the step of pivoting the tool, depending on the at least one parameter representing the contact between the tool and the wheel, is preceded by the step of detecting a position and/or a speed and/or an acceleration of the support arm or a component thereof along the direction substantially parallel to the axis of rotation of the wheel and/or along a direction substantially perpendicular to said axis of rotation of the wheel.

According to this embodiment, the step of pivoting the tool, depending on the at least one parameter representing the contact between the tool and the wheel, is also preceded by the step of sending to the control unit a signal representing the position and/or speed and/or acceleration of the support arm or a component thereof along the direction substantially parallel and/or substantially perpendicular to the axis of rotation of the wheel.

According to a preferred embodiment, the method according to the present invention involves the step of using the control unit to generate an optimized signal based on a combination of the at least one parameter representing the contact between the tool and the wheel, together with the signal representing the position and/or speed and/or acceleration of the support arm and/or a component thereof along the direction substantially parallel and/or substantially perpendicular to the axis of rotation of the wheel. Still according to this preferred embodiment, the method according to the present invention further comprises the step of pivoting the tool between the first withdrawn position with respect to the axis of rotation of the wheel and the second advanced position with respect to the axis of rotation of the wheel, depending on the optimized signal generated by the control unit.

Below, by way of example and therefore in a non-limiting manner, a number of preferred embodiments of the present invention will be described.

BRIEF DESCRIPTION OF THE DRAWINGS

This description will be provided hereinbelow with reference to the attached drawings which are provided solely by way of a non-limiting example and in which.

DESCRIPTION OF PREFERRED EMBODIMENTS OF THE INVENTION

Figure 1:
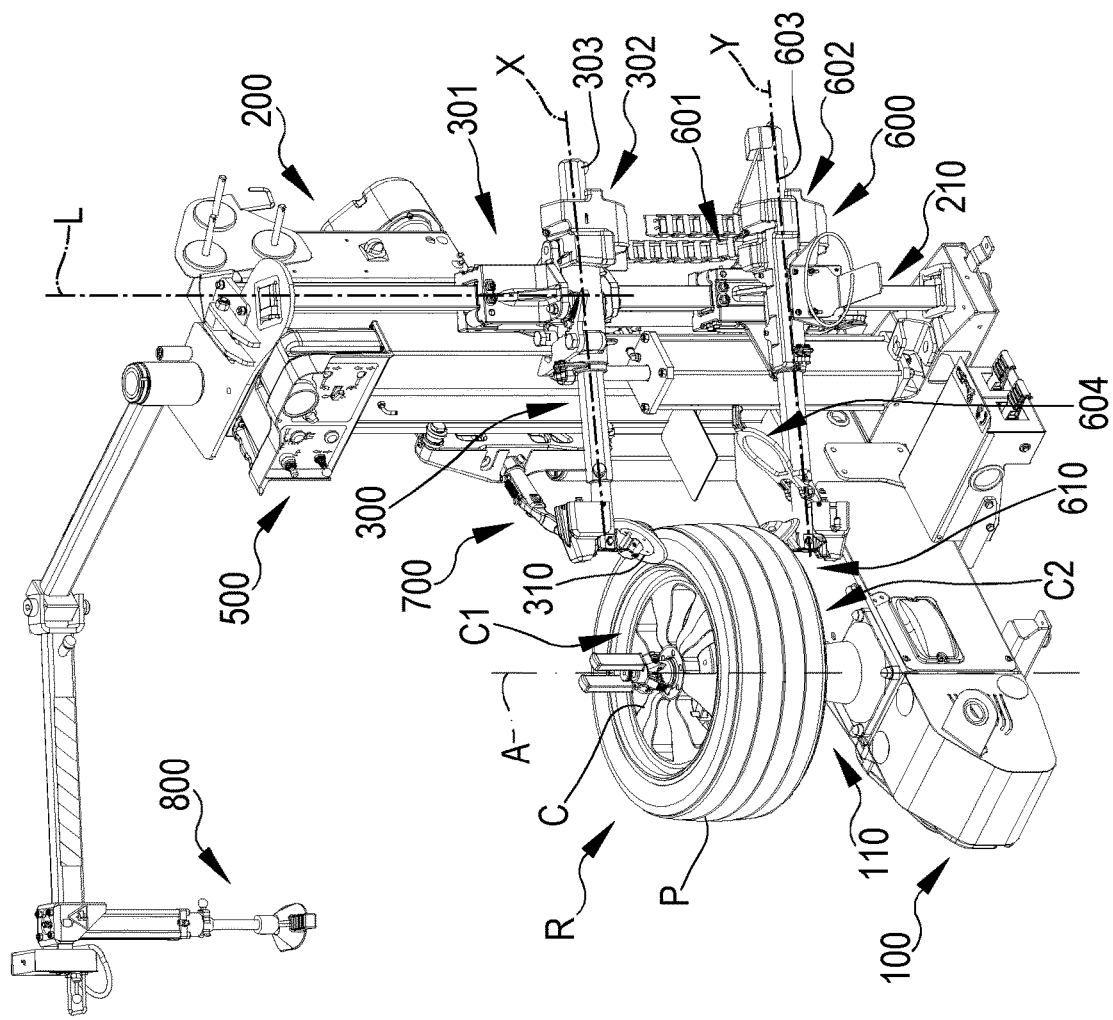
FIG. 1 shows an axonometric view of an example of a tyre-removal apparatus according to the invention.

In the description which follows, any expressions used, such as "right-hand", "left-hand", "above", "below", "upper", "lower", "horizontal", "vertical" and the like, are used merely for illustrative purposes and refer to the particular arrangement of the elements present in the attached figures and therefore are not limiting in any way.

With reference to the attached figures, 1 denotes overall an apparatus for maintaining vehicle wheels, in particular a tyre-removal apparatus or machine.

The tyre-removal apparatus 1 comprises a base 100 on which there is mounted a rotating wheel support assembly, referred to in short as "support 110", preferably of the plate type, on which a wheel R comprising a rim C and a tyre P is reversibly clamped using suitable clamping means known per se.

The base 100 has, joined thereto, a frame 200 having an upright 210 extending mainly at right angles with respect to the support surface of the base. In the figure, the upright 210 extends vertically with respect to the horizontal surface on which the base 100 rests.

However, the present invention also comprises the possible configuration where the upright 210 extends mainly parallel to the support surface of the base, this being frequently the case of tyre-removal apparatus intended for the wheels of heavy vehicles.

The longitudinal axis L of the upright 210 is therefore, in any case, substantially parallel to the axis of rotation A of the wheel R which is clamped on the support 110, both in the case where this axis of rotation A is vertical and in the case where it is horizontal.

The upright 210 has associated with it a support arm 200 movable along the longitudinal axis L, namely along a direction substantially parallel to the axis of rotation A of the wheel R.

The support arm 300 is composed of a first element 301 able to slide along the longitudinal direction L of the upright 210 and a second element 302 which is coupled to the first element 301 and inside which a component or arm-piece 303 slides, the longitudinal axis X of the latter being substantially parallel to the horizontal support surface of the base 100 and therefore being able to move along a direction substantially perpendicular to the axis of rotation of the wheel.

A tool, in the particular case of FIG. 1 a bead breaker disc 310, is mounted pivoting on one end of the support arm 300, in particular on one end of the arm-piece 303.

The bead breaker disc 310 is mounted idle on the support arm 300 and is designed to operate on the wheel R in the vicinity of a first edge C1, or upper edge, of the rim C. In other words, the bead breaker disc 310 is designed to operate on the first bead, or upper bead, of the tyre P.

The tyre-removal machine according to FIG. 1 also comprises a second support arm 600, which is also movable along the longitudinal axis L, namely along a direction substantially parallel to the axis of rotation A of the wheel R.

The second support arm 600 comprises a first element 601 able to slide along the longitudinal direction L of the upright 210 and a second element 602 which is coupled to the first element 601 and inside which a component or arm-piece 603 can slide, the longitudinal axis Y of the latter being substantially parallel to the horizontal support surface of the base 100 and therefore being able to move along a direction substantially perpendicular to the axis of rotation of the wheel.

A tool, in the particular case of FIG. 1 a bead breaker disc 610, is mounted pivoting on one end of the support arm 600, in particular on one end of the arm-piece 603.

The bead breaker disc 610 is mounted idle on the support arm 600 and is designed to operate on the wheel R in the vicinity of a second edge C2, or lower edge, of the rim C. In other words, the bead breaker disc 610 is designed to operate on the second bead, or lower bead, of the tyre P.

In the present description below, reference will be made mainly to the support arm 300 carrying the bead breaker disc 310 designed to operate on the upper bead of the tyre P. However, the functions of the second support arm 600 and of the associated bead breaker disc 610 designed to operate on the lower bead of the tyre P are entirely similar and, therefore, for the sake of conciseness, the description provided in relation to the first support arm will not be repeated for said second support arm 600. In fact, in general the sole difference of the second support arm 600 is that it comprises, in addition to the bead breaker disc 610, a further pivoting tool 604 designed to facilitate the mounting of the lower bead, this further pivoting tool 604 being known per se, for example from the patent document EP2949487A1.

In the light of the present invention it is therefore to be understood that what is described and claimed in relation to the first support arm 300 must be regarded as being described and claimed also in relation to the second support arm 600.

The tyre-removal machine shown in FIG. 1 further comprises a pivoting mounting/demounting tool 700 for mounting the tyre P on the rim C and/or for removing, once the bead breaking operation has been completed, the tyre P from the rim C.

In the description below, the pivoting mounting/demounting tool 700 will not be described in detail. However, the present invention, which will be described instead in detail in relation to the bead breaker tool 310, must be clearly understood as being applicable also to the pivoting mounting/demounting tool 700.

The machine shown in the figures also comprises an auxiliary tool 800, known per se, designed to facilitate the mounting and demounting operations.

Figure 2:
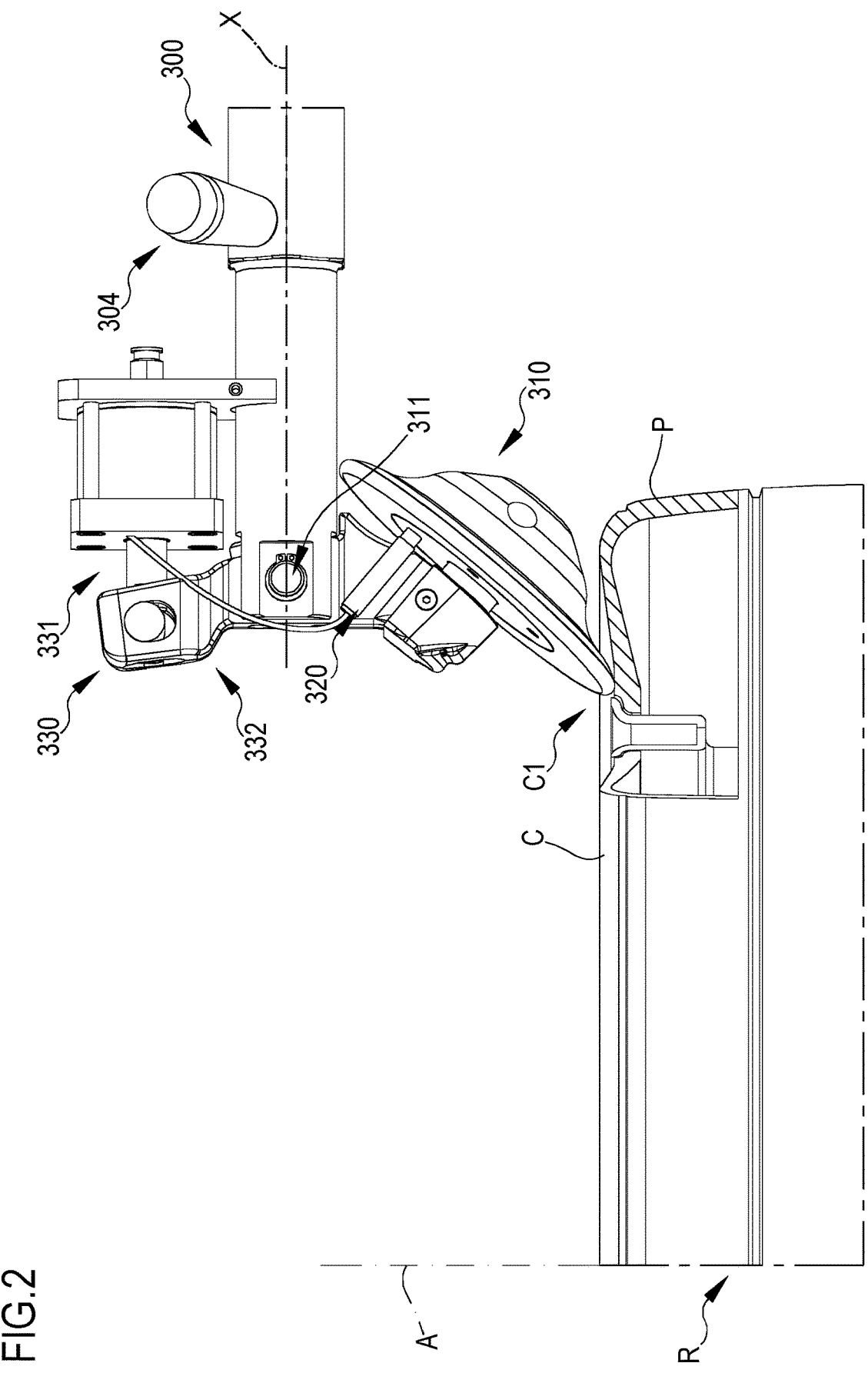
FIG. 2 shows a pivoting tool according to a first embodiment of the present invention, in a first position retracted with respect to the axis of rotation of the wheel.

With reference to FIG. 2, the bead breaker disc 310 mounted idle on the support arm 300 is shown before the start of the bead breaking operation, in a first position, retracted with respect to the axis of rotation A of the wheel.

The bead breaker disc 310 is positioned, by an operator by means of the handle 304 or at least partially automatically, in the vicinity of the upper edge C1 of the rim, without however generally touching it. This movement of the bead breaker tool generally is performed by displacing the support arm both along a direction substantially parallel to the axis of rotation of the wheel, and along a direction substantially perpendicular to this axis of rotation.

Optionally, the support arm which supports the bead breaker tool may also be rotated about the longitudinal axis L of the upright 210, in a plane substantially parallel to the support surface of the base 100 of the tyre-removal apparatus.

The bead breaker disc 310 is mounted pivoting on the support arm 300 by means of a bracket 332 hinged with the pivot pin 311 of the support arm 300.

In the embodiment shown in FIG. 2, the sensor 320 is a proximity sensor. Since, in fact, the bead breaker disc is mounted idle and is therefore free to rotate, the moment it is placed in contact with the tyre P, when the wheel R is rotated by the support 110, the bead breaker disc will also be made to rotate as a result of being pulled along.

The proximity sensor, interacting in a known manner with a suitably shaped bead breaker disc 310, will detect the rotation thereof with respect to the support arm 300 and then send a signal to the control unit 400 of the tyre-removal machine 1, which will activate the pneumatic actuator 330 which, by means of the stem 331, will pivot the bracket 332 about the pivot pin 311, causing it to rotate in a clockwise direction.

Figure 3:
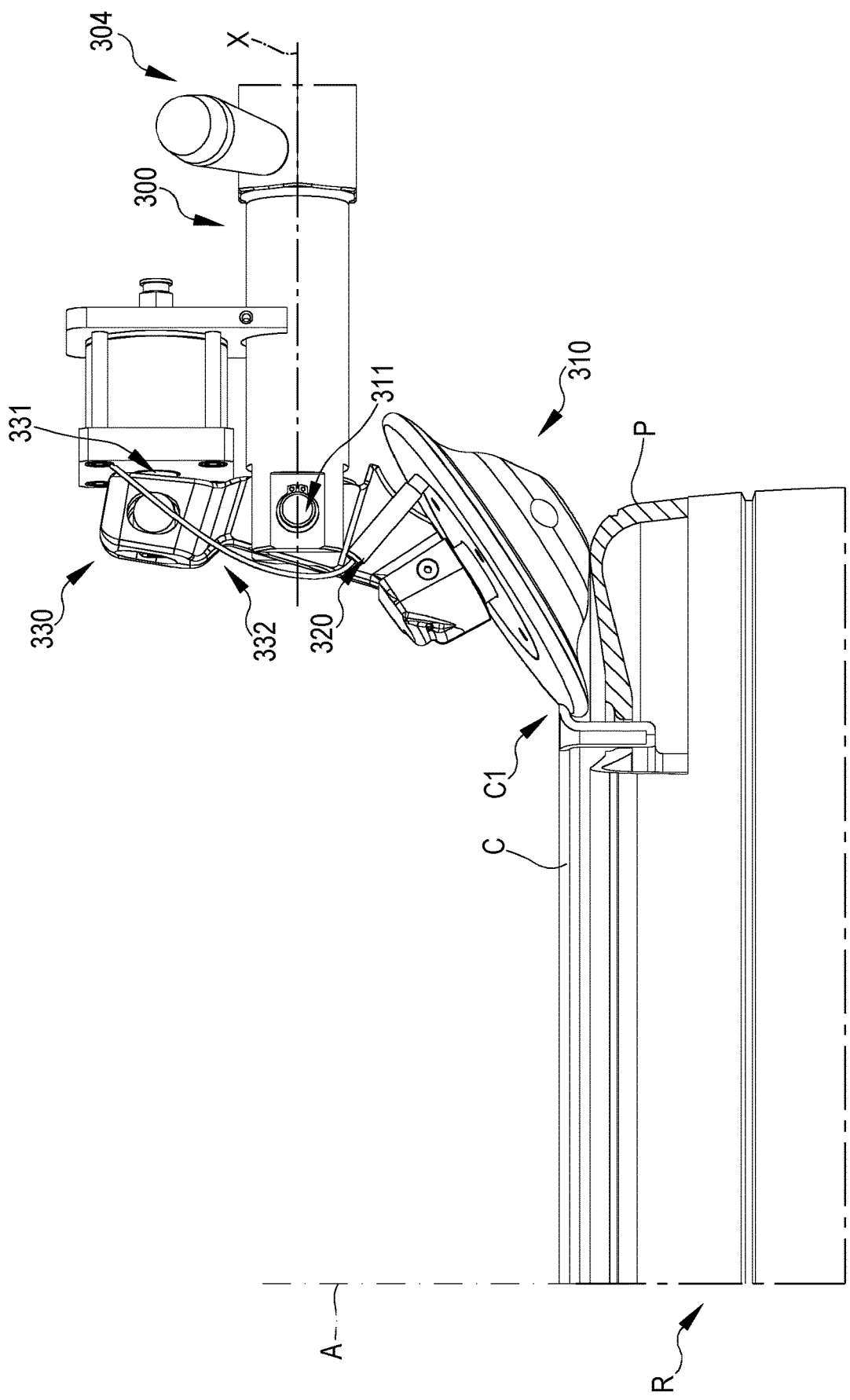
FIG. 3 shows the pivoting tool according to FIG. 2, in a second position advanced with respect to the axis of rotation of the wheel.

In this way, as can be seen in FIG. 3, the bead breaker disc 310 will be made to oscillate in a clockwise direction so as to reach a second position which, compared to the previous position, is situated closer to the axis of rotation A of the wheel R.

In this second position, the bead breaker disc 310 is able to be inserted underneath the edge C1 of the rim and exert effectively a pressure on the sidewall of the tyre, therefore separating the bead of the tyre from the rim, as the wheel R is rotated by the support 110.

Often, during this step, the support arm 300 of the tool 310 is also suitably moved along a direction substantially parallel to the axis of rotation A of the wheel, towards the wheel, so as to exert a greater pressure on the tyre and facilitate the separation of the bead from the rim.

During this step, in general, the bead breaker disc may come into contact both with the tyre and with the rim.

Once the bead breaking operation has been completed, the bead breaker tool 310 will be moved away from the wheel, and the bead breaking disc will resume again its initial position retracted with respect to the axis of rotation A of the wheel R.

Figure 4:
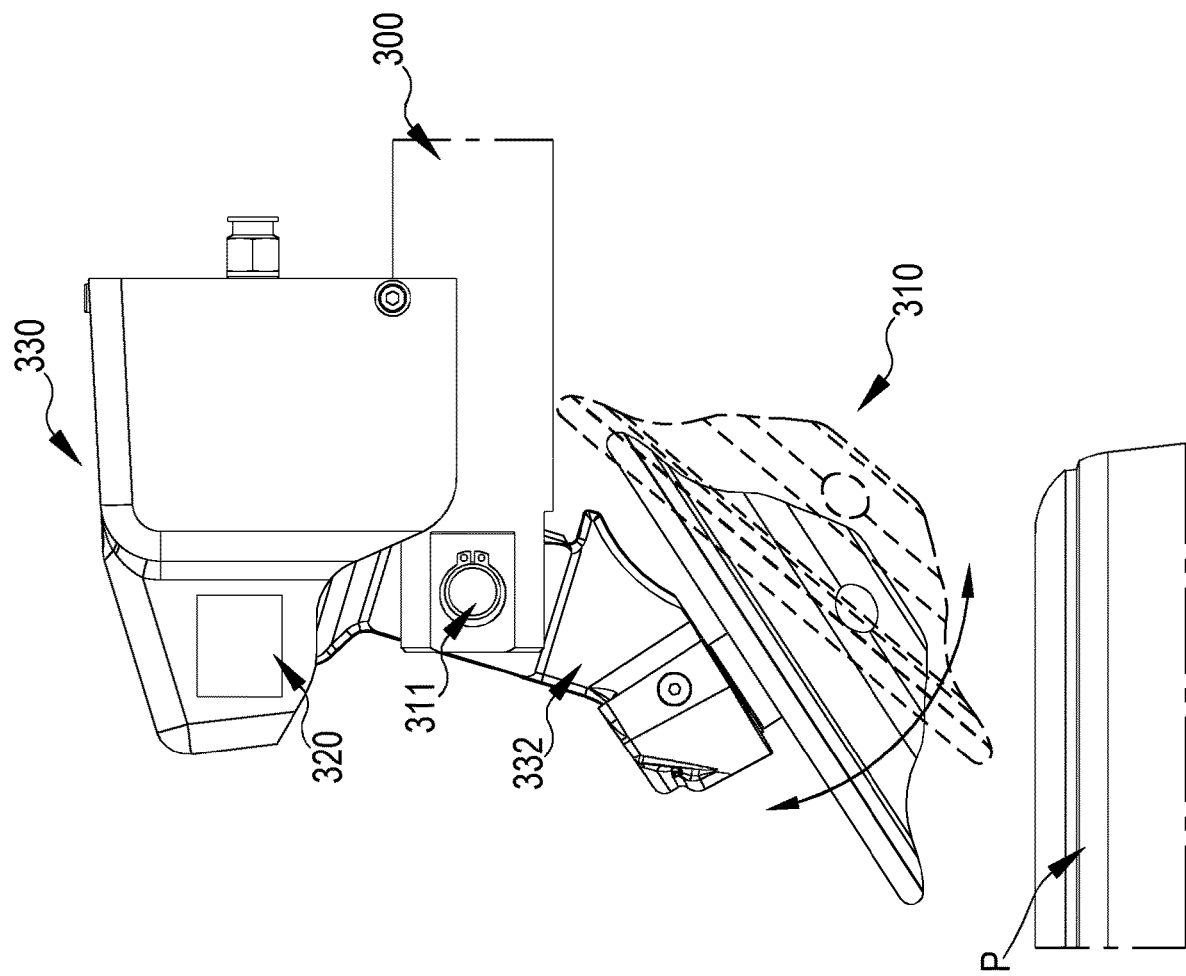
FIG. 4 shows in schematic form, in both the positions, i.e. retracted/advanced with respect to the axis of rotation of the wheel, a pivoting tool according to a second embodiment.

FIG. 4 shows in schematic form, in both the positions, retracted/advanced with respect to the axis of rotation of the wheel, a pivoting bead breaker tool of the disc type mounted rotatably idle on the support arm, according to a different embodiment.

In particular, the sensor 320, shown schematically in FIG. 4, is a proximity sensor, able to detect a small initial oscillation of the bracket 332 about the pivot pin 311, with respect to the support arm 300, which occurs when the bead breaker disc comes into contact with the tyre P (for the sake of simpler illustration, the actual contact between tool and tyre is not shown in the figure).

Once the contact is detected, the proximity sensor 320 sends a signal to the control unit 400 which in turn controls the pneumatic actuator 330 so as to pivot the bracket 332 in a clockwise direction, therefore moving the bead breaker disc from a first position retracted with respect to the axis of rotation A of the wheel R, into a second position advanced with respect to the axis of rotation of the wheel.

The pivoting command sent by the control unit 400 to the pneumatic actuator 330 may be sent both when the sensor 320 detects the contact between wheel and tool, irrespective as to any other conditions, and depending on the presence of other conditions, in addition to detection of the contact between wheel and tool.

For example, in a possible embodiment, the control unit is designed to send the pivoting command only if it is established that the wheel is, at the same time, rotated. This check may be performed by the control unit in various ways, for example by checking the current consumption of an electric motor (known per se and not shown in the figures) used to rotate the support 110, or by directly detecting a rotation of the support 110, for example by means of an encoder.

In another embodiment, the control unit sends the pivoting command only if it is established that the tool is positioned correctly with respect to the wheel. The check as to the position of the tool may for example be performed by using potentiometric sensors associated with the support arm 300, and/or by using optical sensors able to detect the position of the edge of the tyre, etc.

In one embodiment, the pivoting command is sent only if, in addition to the signal indicating contact between tyre and tool obtained from the sensor 320 associated with the tool 310, the control unit 400 receives at least one further signal indicating that contact has occurred between tyre and tool, from a further sensor associated with a different component of the tyre-removal machine.

Figure 5:
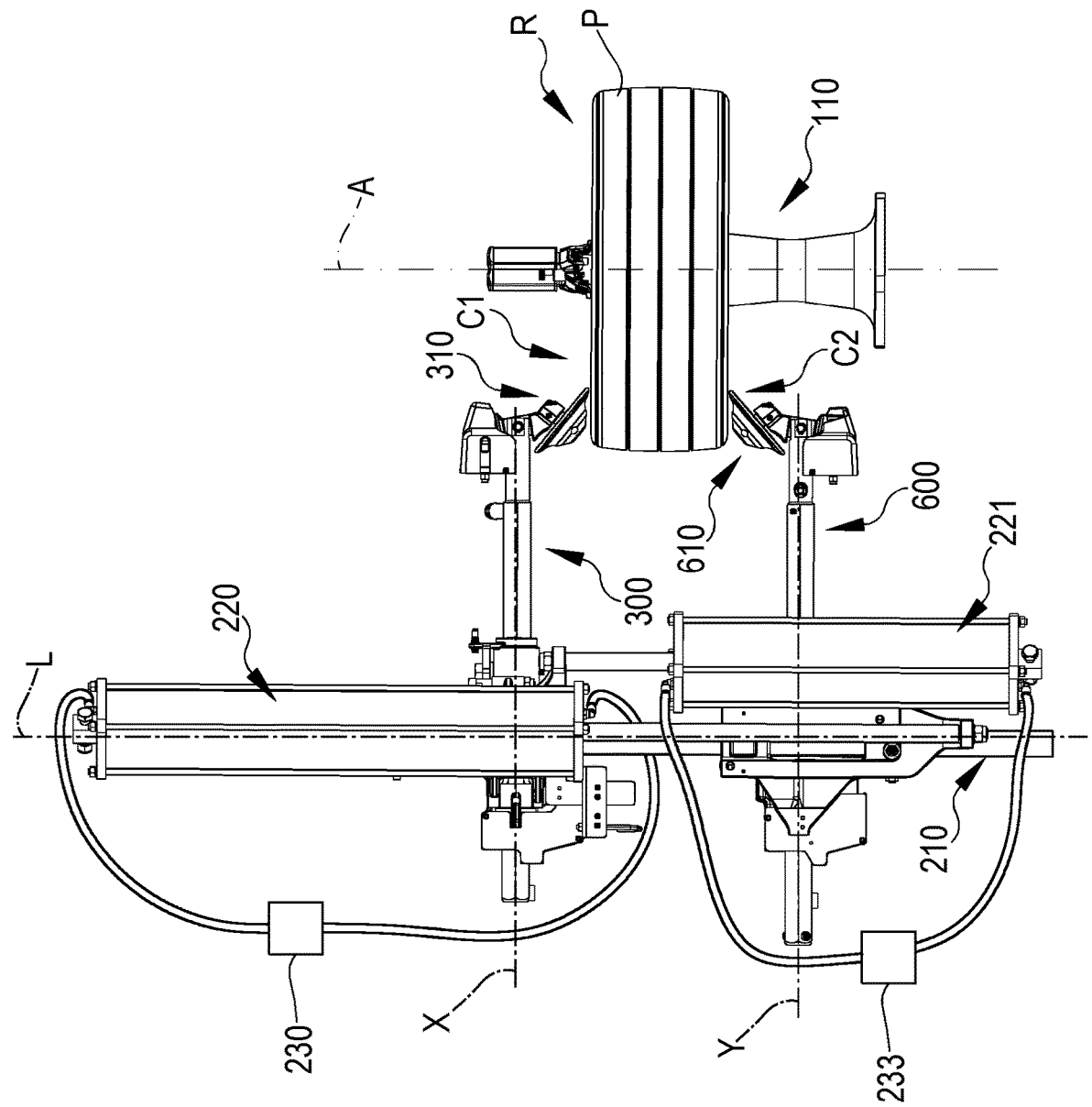
FIG. 5 shows in schematic form a detail of the system for actuating the support arm of the pivoting tool, according to a first embodiment of the present invention.

With reference to FIG. 5, this shows in schematic form both the support arm 300 carrying the bead breaker disc 310 designed to operate on the upper bead of the tyre P, namely in the vicinity of a first edge, or upper edge C1, of the rim C, and the second support arm 600 carrying the bead breaker disc 610 designed to operate on the lower bead of the tyre P, namely in the vicinity of a second edge, or lower edge C2, of the rim C.

In FIG. 5, the sensor 320 associated with the bead breaker tool 310 and able to detect a parameter representing the contact between tool and tyre is not shown for the sake of simpler illustration. Of course, the second bead breaker disc 610 will also be associated with a respective, similar contact sensor 620, which for the sake of simpler illustration is likewise not shown in the figures.

The support arm 300 is operated, during its movement along the longitudinal direction L of the upright 210, by the pneumatic actuator 220.

The pneumatic actuator 220 comprises a piston sliding inside a jacket and defining therein a first chamber upstream of the piston and a second chamber downstream of the piston. The pressure sensor 230 is operationally connected to both the chambers and is configured to determine a first pressure relating to the first chamber and a second pressure relating to the second chamber. The pressure sensor 230 is therefore able to send to the control unit 400 a signal representing the difference in pressure between the two chambers of the actuator 220, namely a combined signal of the pressures present in the two chambers.

Depending on the pressure signal received from the pressure sensor 230, the control unit 400 is able to establish the presence of a contact between the tool 310 and wheel R, independently of the contact signal received from the sensor 320 mounted on the tool 310.

In this way, using two different parameters, obtained from different sensors which operate on different components of the tyre-removal machine, both however representing the contact between tool and wheel, the control unit 400 is able to establish the actual contact in a very precise and reliable manner.

For example, by using two different parameters, the control unit may easily differentiate the signals relating to actual contact from those signals which may be generated in error, for example due to so-called false contacts.

Or, by simply using two different parameters, the control unit may easily differentiate the contact between tool and tyre from the contact between tool and rim.

For example, the contact between tool and rim is generally not recommended at the start of the bead breaking procedure, when the bead breaker tool is located in the first position, retracted with respect to the axis of rotation A of the wheel. If, instead, contact between tool and rim is actually detected during this initial stage of the procedure, the control unit 400 may command the emission of a warning signal for the operator, for example an acoustic signal, and/or may interrupt the bead breaking process, for example stopping the electric motor used to perform rotation of the support 110 on which the wheel is clamped. In this way it is possible to prevent damage to the tyre, rim and/or tool itself.

Similar considerations may obviously also apply in the case where the wheel maintenance process is a process involving removal of the tyre from the rim instead of a bead breaking process, and the tool is a demounting or mounting/demounting tool instead of a bead breaker tool.

Still with reference to FIG. 5, the description provided in relation to the tool 310 designed to operate on the upper bead of the tyre, namely in the vicinity of the first edge C1 of the rim, is similarly applicable also to the tool 610 designed to operate on the lower bead of the tyre, namely in the vicinity of the second edge C2 of the rim.

The tool 610 is mounted rotatably idle on the support arm 600, which is operated, during its movement along a direction parallel to the longitudinal direction L of the upright 210, by the pneumatic actuator 221. Said actuator also comprises a piston sliding inside a jacket and defining therein a first chamber upstream of the piston and second chamber downstream of the piston.

The pressure sensor 233 is operationally connected to both the chambers of the pneumatic actuator 221 and is configured to determine a first pressure relating to the first chamber and a second pressure relating to the second chamber. The pressure sensor 233 is therefore able to send to the control unit 400 a signal representing the difference in pressure between the two chambers of the actuator 221, namely a combined signal of the pressures present in the two chambers.

The above description provided in relation to the pneumatic actuator 220 and the pressure sensor 230 is therefore also applicable to the pneumatic actuator 221 and the pressure sensor 233.

Figure 6:
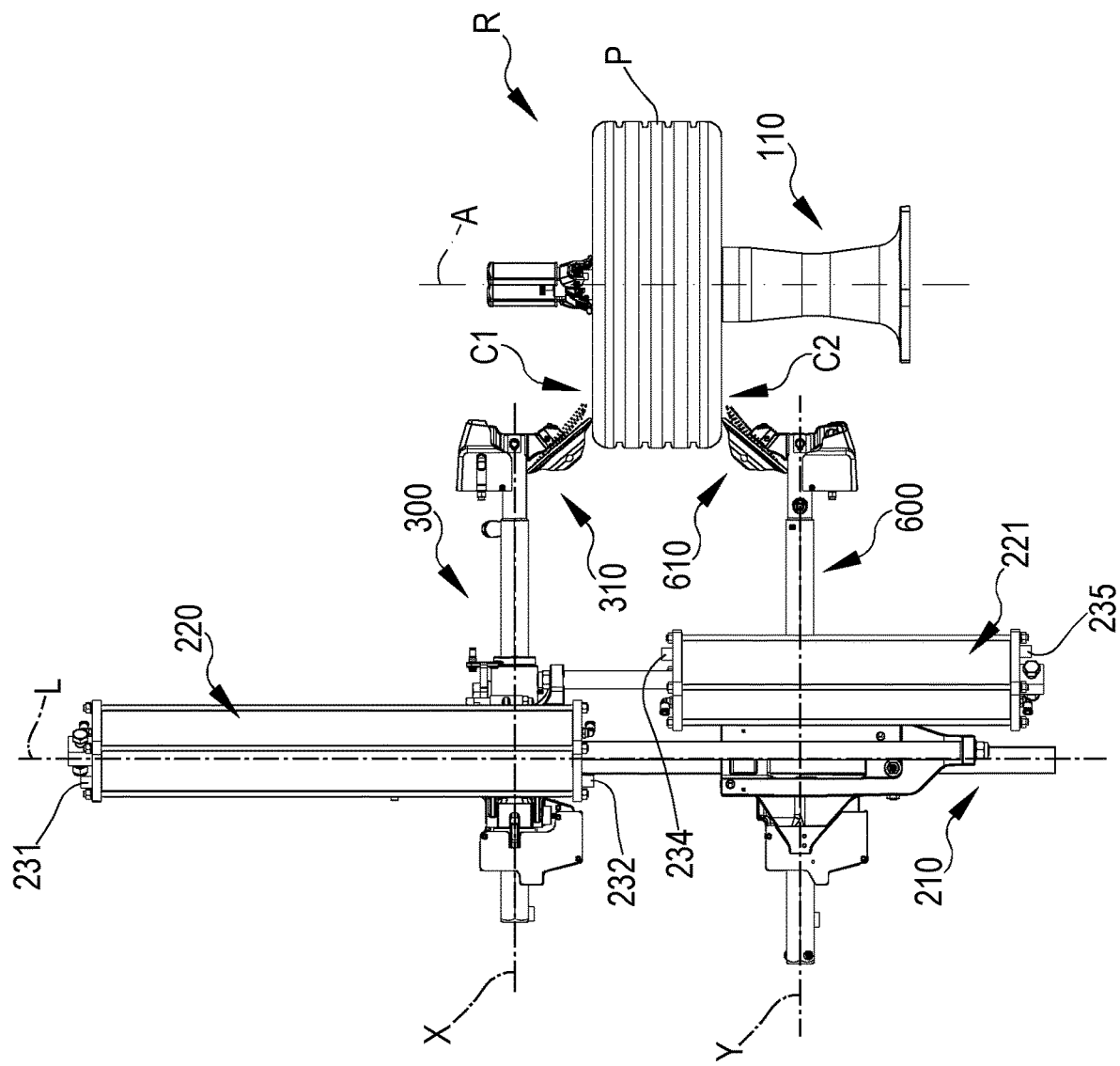
FIG. 6 shows in schematic form a detail of the system for actuating the support arm of the pivoting tool, according to a second embodiment of the present invention.

FIG. 6 shows in schematic form another possible embodiment for performing the pivoting movement of the tool 310, using a further signal indicating contact between the tyre and the tool in addition to the contact signal received from the sensor 320 (not shown in the figures) associated with the first bead breaker disc 310 and/or from the sensor 620 (not shown in the figures) associated with the second bead breaker disc 610.

In this case also, the support arm 300 is operated, during its movement along the longitudinal direction L of the upright 210, by the pneumatic actuator 220.

The pneumatic actuator 220 comprises a piston sliding inside a jacket and defining therein a first chamber upstream of the piston and a second chamber downstream of the piston. The first pressure sensor 231 is operationally connected to the first chamber, while the second pressure sensor 232 is operationally connected to the second chamber. Both the sensors 231, 232 are configured to determine, respectively, a first pressure relating to the first chamber and a second pressure relating to the second chamber. The first pressure sensor 231 is therefore able to send to the control unit 400 a signal representing the pressure present in the first chamber of the actuator 220, while the second pressure sensor 232 is able to send to the control unit 400 a signal representing the pressure present in the second chamber of the actuator 220. Both the sensors 231, 232 are therefore able to communicate with the control unit 400 independently of each other.

Depending on both the pressure signals, which are acquired separately, the control unit 400 is able to establish the presence of contact between the tool 310 and the wheel R, independently of the contact signal sent from the sensor 320 mounted on the tool 310.

A possible constructional variant also envisages the use of a single pressure sensor for the actuator, for example the single first pressure sensor 231 associated with the first chamber of the actuator 220.

The same configuration is also present in the case of the second pneumatic actuator 221, designed to operate the second support arm 600, during its movement along a direction parallel to the longitudinal direction L of the upright 210.

This second pneumatic actuator 221 also comprises a first chamber and a second chamber and respective pressure sensors 234, 235 associated with them are able to determine respectively a parameter representing a first pressure relating to the first chamber and a parameter representing a second pressure relating to the second chamber, and to send respective signals to the control unit 400, independently of each other.

In this case also, a possible constructional variant envisages the use of a single pressure sensor, able to send to the control unit 400 a signal relating to a single chamber of the actuator 221.

In each case, the control unit 400 may therefore have access to different parameters obtained by different sensors which operate on different components of the tyre-removal machine, both however representing the contact between tool and wheel, in this case the contact between the second bead breaker disc 610 and the wheel R.

Operationally speaking, the process of removing a tyre from the rim and of separating the bead of the tyre from the rim, according to the present invention, is performed in accordance with the following steps which will be described below.

For simpler illustration, and merely by way of a non-limiting example, reference will be made to a bead breaking process.

First of all, an operator clamps the tyred wheel R on the plate of the rotating support 110 of the tyre-removal apparatus 1. Following which the tyre is completely deflated.

At this point the bead breaker tool 310 is moved towards the first edge C1 of the rim C of the wheel.

The movement of the bead breaker 310 along the longitudinal direction L of the upright 210, namely along a direction substantially parallel to the axis of rotation A of the wheel, is generally assisted by the pneumatic actuator 220 which may be operated by the operator by means of special control devices, for example pedals, switches, pushbuttons, etc., which may be arranged on a special control panel.

The movement of the support arm 300 and therefore of the bead breaker 310 towards the wheel, along a direction perpendicular to the axis A of rotation of the wheel, may be performed manually by the operator, using the handle 304 with which the support arm 300 is generally provided, or automatically, in the case where the tyre-removal apparatus has special dedicated actuator means, generally of the electromechanical or pneumatic type, controlled by the control unit 400.

The automatic—or at least partially automatic—movement in both the directions described above may also be assisted by special input means 500 present on the tyre-removal machine and able, for example, to define the diameter of the rim.

These input means are generally associated with memory means which are accessible by the control unit 400 and able to store, at least temporarily, data relating to the dimensions of the wheel, for example data relating to the diameter of the rim and/or to the width of the wheel, etc.

These input means 500 may for example comprise a simple numerical keypad, by means of which the operator manually enters the dimensional data relating to the wheel to be operated on, or may comprise mechanical feelers, optical sensors, and the like.

The dimensional data of the wheel, once detected with the aid of the input means, in relation to the first wheel of the vehicle being processed on the tyre-removal machine, will then be retrieved, by means of the control unit 400, from the memory means, so as to speed up the demounting operation for the entire set of wheels relating to the same vehicle.

In the case where the support arm 300 is provided with position and/or speed and/or acceleration sensors, able to detect the position and/or speed and/or acceleration of the support arm along a direction substantially parallel and/or along a direction substantially perpendicular to the axis of rotation A of the wheel, this information may be transmitted to the control unit 400 which will use it to control with greater precision the pneumatic actuator 220 for performing the vertical movement of the support arm 300 and/or the electromechanical actuator means, for performing the horizontal movement of the support arm 300.

Once the bead breaker tool has been correctly positioned with respect to the wheel, the wheel is rotated by means of the support 110.

Immediately before starting rotation of the wheel, or alternatively immediately after rotation, the bead breaker disc 310 is placed in contact with the tyre.

This contact between bead breaker disc 310 and sidewall of the tyre P is detected independently of both the sensor 320 associated with the tool 310, and the pressure sensor 230 associated with the pneumatic actuator 220 (or optionally, of at least one of the pressure sensors 231 and 232 associated with the first and second chambers of the pneumatic actuator 220, respectively).

Respective signals are therefore sent, from the aforementioned sensors, to the control unit 400 in order to control the actuator 330 to pivot the bead breaker tool 310, as described above.

At the same time as or following pivoting of the tool, the control unit (or the operator) may cause the support arm 300 and therefore the bead breaker disc 310 to move towards the wheel, if necessary in both the vertical direction and horizontal direction so as to allow the tool to exert a more efficient pressure on the tyre and therefore favour separation of the bead.

Since the wheel is made to rotate by the support 110, the bead breaker tool may operate along an entire circumferential revolution and therefore separate the whole upper bead from the edge C1 of the wheel rim.

The operation is then repeated, using similar methods, by the lower bead breaker disc 610, in order to complete bead breaking, from the wheel rim, of the lower bead.

At that point, the operator may easily remove the tyre from the wheel rim, using the special mounting or mounting/demounting tool.

LIST OF REFERENCES 1 tyre-removal apparatus
R wheel
P tyre
C wheel rim
C1 first edge of the wheel rim C
C2 second edge of the wheel rim C
100 base
110 support for receiving and rotating the wheel R
A axis of rotation of the wheel R
200 frame
210 upright
L longitudinal axis of the upright 210
220, 221 hydraulic or pneumatic actuator
230, 231, 232, 233, 234, 235 pressure sensors
300 (first) support arm
301 first element of the (first) support arm
302 second element of the (first) support arm
303 arm-piece of the (first) support arm
304 handle
X longitudinal axis of the (first) support arm
310 (first) bead breaker disc
311 pivot pin
320 sensor associated with the (first) bead breaker disc
330 actuator for pivoting the (first) bead breaker disc
332 bracket
331 stem
400 control unit
500 input means
600 (second) support arm
601 first element of the (second) support arm
602 second element of the (second) support arm
603 arm-piece of the (second) support arm
604 further pivoting tool Y longitudinal axis of the (second) support arm
700 mounting/demounting tool
800 auxiliary tool

The invention claimed is:

1. Apparatus for mounting a tyre on a rim of a wheel and/or for removing a tyre from a rim of a wheel of a vehicle, comprising:
    a base having a support for receiving and rotating the wheel;
    a frame joined to the base and having an upright with a longitudinal axis substantially parallel to an axis of rotation of the wheel;
    a support arm associated with the upright and movable in a direction substantially parallel to the axis of rotation of the wheel;
    a tool for operating on the wheel, said tool being mounted pivoting on the support arm;
    a sensor associated with the tool and able to detect at least one parameter representing contact between the tool and the wheel,
    characterized in that
        the sensor is operationally connected to a control unit able to control an actuator, associated with the support arm, so as to pivot the tool between a first withdrawn position with respect to the axis of rotation of the wheel and a second advanced position with respect to the axis of rotation of the wheel, depending on the at least one parameter representing the contact between the tool and the wheel.

2. Apparatus according to claim 1, wherein
    the control unit is able to control the actuator for pivoting the tool, depending on at least one further parameter representing the contact between the tool and the wheel and received from at least one further sensor associated with an actuator able to move the support arm along the direction substantially parallel to the axis of rotation of the wheel.

3. Apparatus according to claim 2, wherein
    the actuator able to move the support arm along the direction substantially parallel to the axis of rotation of the wheel is a hydraulic or pneumatic actuator; and wherein the at least one further sensor is a pressure or feed rate sensor associated with the hydraulic or pneumatic actuator, said pressure or feed rate sensor being able to detect a pressure or feed rate parameter, respectively, representing the contact between the tool and the wheel, said pressure or feed rate sensor being operationally connected to the control unit.

4. Apparatus according to claim 2, wherein
    the actuator able to move the support arm along the direction substantially parallel to the axis of rotation of the wheel is an electric motor; and wherein the at least one further sensor is a current or speed or acceleration sensor associated with the electric motor, said current or speed or acceleration sensor being able to detect a current consumption or speed or acceleration parameter, respectively, representing the contact between the tool and the wheel, said current or speed or acceleration sensor being operationally connected to the control unit.

5. Apparatus according to claim 2, wherein
    the actuator able to move the support arm along the direction substantially parallel to the axis of rotation of the wheel is an electromechanical actuator; and wherein the at least one further sensor is a force or torque sensor associated with the electromechanical actuator, said force or torque sensor being able to detect a force or resistance torque parameter, respectively, representing the contact between the tool and the wheel, said force or torque sensor being operationally connected to the control unit.

6. Apparatus according to claim 1, wherein the tool is a mounting/demounting tool.

7. Apparatus according to claim 1, wherein the tool is a bead breaker disc mounted rotatably idle on the support arm.

8. Apparatus according to claim 7, wherein the at least one parameter representing the contact between the tool and the wheel is correlated with a rotation of the bead breaker disc relative to the support arm.

9. Apparatus according to claim 1, wherein the support arm comprises at least one first position and/or speed and/or acceleration sensor designed to detect the position and/or the speed and/or the acceleration of the support arm along the direction substantially parallel to the axis of rotation of the wheel.

10. Apparatus according to claim 1, wherein the support arm or at least one component thereof comprises at least one second position and/or speed and/or acceleration sensor designed to detect the position and/or the speed and/or the acceleration of the support arm or the at least one component thereof along a direction substantially perpendicular to the axis of rotation of the wheel.

11. Apparatus according to claim 9, wherein the control unit is able to control the actuator for pivoting the tool, depending on an optimized signal generated by a combination of the at least one parameter representing the contact between the tool and the wheel, together with a signal representing the position and/or speed and/or acceleration of the support arm or the at least one component thereof obtained respectively by the first position and/or speed and/or acceleration sensor and/or by the second position and/or speed and acceleration sensor.

12. Apparatus according to claim 10, comprising:
    input means, preferably comprising an optical sensor, for defining a diameter of the rim, said input means being operationally connected to the control unit; and
    actuator means, preferably of the electromechanical type, for moving the support arm or the at least one component thereof along the direction substantially perpendicular to the axis of the rotation of the wheel, said actuator means being controlled by the control unit depending on the diameter of the rim defined by the input means and/or depending on a position and/or speed and/or acceleration signal of the support arm or the at least one component thereof obtained by the second position and/or speed and/or acceleration sensor.

13. Method for removing a tyre from a rim of a wheel of a vehicle, comprising the steps of:
    clamping a wheel comprising a rim and a tyre on a support for receiving and rotating the wheel about an axis of rotation;
    positioning a tool for operating on the wheel, in the vicinity of a first edge of the rim of the wheel, said tool being mounted pivoting on a support arm;
    moving the support arm along a direction substantially parallel to the axis of rotation of the wheel;
    rotating the support;
    detecting, with a sensor associated with the tool, at least one parameter representing contact between the tool and the wheel,
    characterized in that it comprises the step of:
        sending a signal, relating to the at least one parameter, representing the contact between the tool and the wheel, to a control unit able to control an actuator so as to pivot the tool, and the step of:
  pivoting the tool between a first withdrawn position with respect to the axis of rotation of the wheel and a second advanced position with respect to the axis of rotation of the wheel, depending on the at least one parameter representing the contact between the tool and the wheel.

14. Method according to claim 13, wherein the step of pivoting the tool, depending on the at least one parameter representing the contact between the tool and the wheel, is preceded by the step of:
  detecting, with a further sensor associated with an actuator for moving the support arm along the direction substantially parallel to the axis of rotation of the wheel, at least one further parameter representing the contact between the tool and the wheel, and by the step of:
    sending to the control unit said at least one further parameter representing the contact between the tool and the wheel.

15. Method according to claim 13, wherein the step of pivoting the tool, depending on the at least one parameter representing the contact between the tool and the wheel, is preceded by the step of:
  detecting a position and/or a speed and/or an acceleration of the support arm and/or of at least one component thereof along the direction substantially parallel to the axis of rotation of the wheel and/or along a direction substantially perpendicular to the axis of rotation of the wheel, and by the step of:
    sending to the control unit a signal representing the position and/or speed and/or acceleration of the support arm or the at least one component thereof along the direction substantially parallel and/or substantially perpendicular to the axis of rotation of the wheel;
  the method further comprising the steps of:
    using the control unit to generate an optimized signal based on a combination of the at least one parameter representing the contact between the tool and the wheel, together with the signal representing the position and/or speed and/or acceleration of the support arm and/or the at least one component thereof along the direction substantially parallel and/or substantially perpendicular to the axis of rotation of the wheel, and
    pivoting the tool between the first withdrawn position with respect to the axis of rotation of the wheel and the second advanced position with respect to the axis of rotation of the wheel, depending on the optimized signal generated by the control unit.

* * * * *